United States Patent [19]
Shu

[11] Patent Number: 5,757,976
[45] Date of Patent: May 26, 1998

[54] ADAPTIVE FILTERING AND THRESHOLDING ARRANGEMENT FOR REDUCING GRAININESS OF IMAGES

[75] Inventor: Joseph S. Shu, San Jose, Calif.

[73] Assignee: Seiko Epson Corporation, Tokyo, Japan

[21] Appl. No.: 755,378

[22] Filed: Aug. 8, 1996

Related U.S. Application Data

[63] Continuation of Ser. No. 320,550, Oct. 11, 1994, abandoned.

[51] Int. Cl.$^6$ ................................................. H04N 1/40
[52] U.S. Cl. ........................... 382/252; 382/237; 358/455; 358/456; 358/458
[58] Field of Search .......................... 358/455, 456, 358/458, 459, 461, 462, 463, 466; 382/237, 252; H04N 1/40

[56] References Cited

U.S. PATENT DOCUMENTS

| | | | |
|---|---|---|---|
| 4,953,013 | 8/1990 | Tsuji et al. | 358/453 |
| 4,955,065 | 9/1990 | Ulichney | 358/456 |
| 5,045,952 | 9/1991 | Eschbach | 358/455 |
| 5,140,432 | 8/1992 | Chan | 358/455 |
| 5,150,429 | 9/1992 | Miller et al. | 358/457 |
| 5,208,684 | 5/1993 | Itoh | 358/456 |
| 5,243,444 | 9/1993 | Fan | 358/455 |
| 5,243,445 | 9/1993 | Koike | 358/462 |
| 5,258,854 | 11/1993 | Eschbach | 358/455 |
| 5,260,810 | 11/1993 | Kanno et al. | 358/455 |
| 5,268,774 | 12/1993 | Eschbach | 358/466 |
| 5,287,419 | 2/1994 | Sato et al. | 358/455 |
| 5,291,309 | 3/1994 | Semasa | 358/455 |
| 5,293,430 | 3/1994 | Shiau et al. | 358/455 |
| 5,307,426 | 4/1994 | Kanno et al. | 358/456 |
| 5,313,287 | 5/1994 | Barton | 358/455 |
| 5,313,533 | 5/1994 | Scott | 358/462 |
| 5,315,669 | 5/1994 | Kumagai | 358/457 |
| 5,343,309 | 8/1994 | Roetling | 358/455 |
| 5,363,213 | 11/1994 | Coword et al. | 358/455 |
| 5,438,634 | 8/1995 | Kumagai | 358/457 |
| 5,467,201 | 11/1995 | Fan | 358/456 |
| 5,627,659 | 5/1997 | Kakutani et al. | 382/252 |

OTHER PUBLICATIONS

*Angling for Color*, B. Fraser, Publish Jun. (1991) pp. 74–82.
*Society for Information Display Intern. Symposium Digest of Technical Papers* vol. XXV, San Jose, CA, Jun. 14–16, (1994); Adaptive Error Diffusion for Multiresolution Rendering, P.W. Wong, pp. 801–804.
*Society for Information Display Intern. Symposium Digest of Technical Papers* vol. XXV, San Jose, CA, Jun. 14–16, (1994); An Efficient Implementation for Stochastic DBS. T.J. Flohr et al. pp. 797–800.
*Society for Information Display Intern. Symposium Digest of Technical Papers* vol. VVX, San Jose, CA, Jun. 14–16, (1994); The Blue–Noise Mask and Its Comparison with Error Diffusion in Color Halftoning. M. Yao et al., pp. 805–808.

*Primary Examiner*—Thomas L. Stoll
*Attorney, Agent, or Firm*—Eric B. Janofsky

[57] ABSTRACT

An adaptive filtering and thresholding arrangement provides a set of error filters having different sizes and associated weighted coefficients for diffusing quantization errors among neighboring pixels in predetermined tonal areas of an image to achieve a smooth halftone image quality. Each error filter circuit is optimally applied to a particular pixel area depending upon the grayscale tone of that area and the desired output print resolution. The arrangement further provides for the addition of "noise" errors to threshold values at selected input image pixel ranges and at the intersection of two differently filtered areas to eliminate visible pattern distortion.

25 Claims, 7 Drawing Sheets

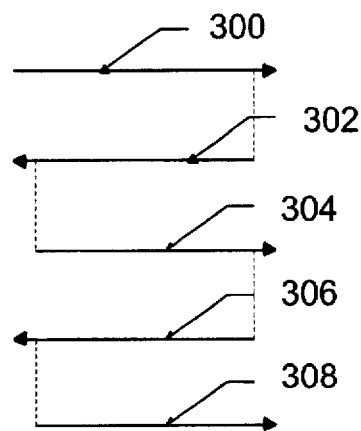
FIG. 3
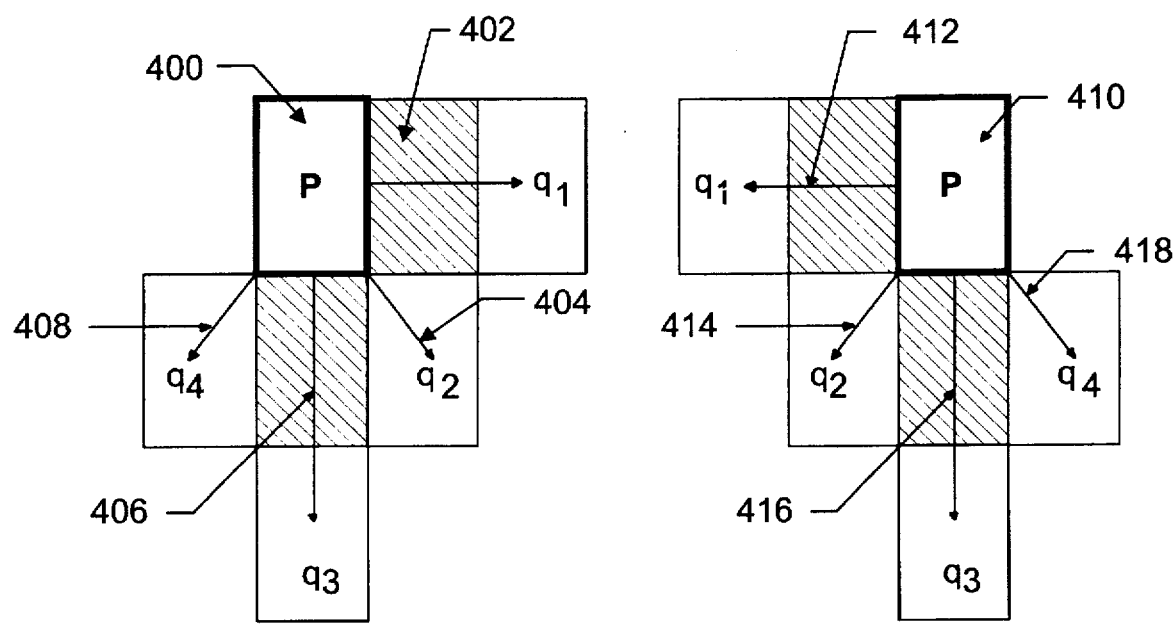
FIG. 4A  FIG. 4B

ADAPTIVE FILTERING AND THRESHOLDING ARRANGEMENT FOR REDUCING GRAININESS OF IMAGES

This is a Continuation of application Ser. No. 08/320,550 filed Oct. 11, 1994 now abandoned.

CROSS REFERENCE TO RELATED APPLICATIONS

The following applications, filed on an even date herewith and assigned to the assignee of the instant application contain related subject matter to the instant application:

IMPROVED METHOD AND APPARATUS FOR VIVID COLOR CORRECTION IN BINARY PRINTING DEVICES, Serial No. (112016-0006, AP007) filed by Joseph S. Shu;

IMPROVED METHOD AND APPARATUS FOR REDUCING ARTIFACTS IN HALFTONED IMAGES USING GRAY BALANCE CORRECTION, Serial No. (112016-0008, AP010) filed by Joseph S. Shu;

APPARATUS AND METHOD FOR ENHANCING COLOR SATURATION OF HALFTONED IMAGES, Serial No. (112016-0007, AP009) filed by Joseph S. Shu;

IMPROVED METHOD AND APPARATUS FOR TONAL CORRECTION IN BINARY PRINTING DEVICES BY PREDISTORTION OF IMAGE DATA UTILIZING INK REDUCTION PROCESSING, Serial No. (112016-0002P1, AP0011) filed by Joseph S. Shu;

IMPROVED METHOD AND APPARATUS FOR DITHER ARRAY GENERATION TO REDUCE ARTIFACTS IN HALFTONED IMAGE DATA UTILIZING INK REDUCTION PROCESSING, Serial No. (112016-0003P1, AP0012) filed by Joseph S. Shu; and METHOD AND APPARATUS FOR MINIMIZING ARTIFACTS IN IMAGES PRODUCED BY ERROR DIFFUSION HALFTONING DATA UTILIZING INK REDUCTION PROCESSING, Serial No. (112016-0001P1) filed by Joseph S. Shu.

BACKGROUND OF THE INVENTION

1. Field of the Invention

The present invention relates to digital printing devices, and in particular, to a technique for minimizing artifacts ("worms") in the printed output of such devices, which artifacts are caused by error diffusion halftoning.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of monochrome printers, all of the dots are printed with a single color whereas with color printers a dot color is chosen from a small set of colors. In any case, the dot itself has a uniform color so that the resulting output consists of an array of colored and blank pixels. Depending upon the type of resolution desired, the density of dots electronically printed on the output medium may be different, e.g., 360 dots per inch (dpi) or 720 dpi.

Pictorial images such as those produced by photographic techniques or by computerized imaging systems, by contrast, are continuous in tonality. If such an image is divided into pixels, each pixel exhibits a "grayscale" color whose tonal value falls within a range of tonal values. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called "preprocessing". Numerous halftoning techniques have been developed and refined over the years. In their simplest form, such techniques compare the value of each digital word with a threshold level, and generate a binary output pixel value depending on the relative values.

For example, a digital scanner processing a continuous-tone image might generate a stream of multi-bit words representing the detected light intensities. Commonly, the numerical value of these words ranges from 0 to 255, corresponding to a 256-level gray scale or an eight-bit word. If such a digital word stream is to be reproduced on a binary printing device, the halftoning process compares the scanner output words with either a single threshold value or an array of threshold values to produce the required binary output pixel stream. In such a system, each 8-bit scanner word has effectively been compressed into a single-bit output word.

Naturally, such compression produces a significant loss of visual information and, in turn, creates distortions in the reproduced image that are not present in the original image. Additional techniques have therefore been developed to reduce the visual distortions created by the halftoning process. One approach, known as "error diffusion", attempts to "diffuse" the "quantization error" (i.e., the difference between the input value represented by a multi-bit word and the output value represented by a single bit or two multi-bit words) proportionally among neighboring pixels. This diffusion is performed using an error filter circuit having proportional weights, each of which adds a portion of the quantization error to the input values of the next pixel in the processing line and to neighboring pixels in the following line or lines. The quantization error is added to the pixel values before processing so that the quantization error is "spread" over several pixels.

In accordance with a conventional error diffusion halftoning embodiment, the threshold value used for comparison with the scanner output words is typically a fixed value, while the filter circuit is typically of a single type. In addition, the input pixels represented by the input words are processed in a conventional "raster" scan pattern (line-by-line where pixel lines are processed from top-to-bottom order, but where alternate pixel lines are processed in opposite directions, i.e., left-to-right and right-to-left). Although this embodiment of the error diffusion process produces an excellent image reproduction, it also creates well-known artifacts called "worms" and "snowplowing" which degrade image quality. The "worms" appear as curved or straight diagonal lines in areas of uniform gray and produce a patterned appearance in the halftoned image. Consequently, various techniques have been used to reduce or eliminate these kinds of artifact patterns.

One known technique adds a predetermined quantity of random "noise" to the multi-bit words of the continuous-tone image data prior to error diffusing. In addition to re-orienting the worms so as to minimize repeatable artifact patterns, this technique also degrades the quality of the resulting image due to the introduction of noise into the image.

Another known method adds noise to the threshold value used for halftoning operations at each pixel along an entire image. In accordance with this embodiment of the error diffusion process, the threshold value is modulated by a random error value and is therefore no longer fixed. As with the previous technique described above, this method tends to "break" repeatable artifact patterns at the expense of reducing image quality.

Still another known technique for reducing worm patterns is disclosed in U.S. Pat. No. 4,955,065, titled *System for Producing Dithered Images from Continuous-tone Image Data*, issued to Ulichney on Sep. 4, 1990. Here, the quantization error is multiplied by a weighting value which varies within a range to introduce a small perturbation. However, the addition of such random noise to the proportional weights of an error filter decreases the quality of a resulting image.

Further, it has been shown that a "large" error filter, i.e., one that diffuses errors over a large area of neighboring pixels, produces a "smoother" image over that area, although the quality of the image suffers for high-tones and blurring arises at sharp edges of the image. This is primarily because the large filter has more elements to diffuse and fine details of the image are lost due to truncation or roundoff techniques. In contrast, a "small" error filter has been shown to increase worm patterns at mid-tone and high-tone image areas.

Therefore, it is among the objects of the present invention to provide an apparatus and a method of improving the quality of the halftone images produced by a binary printing device.

Another object of the invention is to provide a method and apparatus which minimizes image artifacts due to error diffusion halftoning in the output images produced by a binary printing device, such as an ink jet printer or a laser printer.

Still another object of the invention is to provide such a method which can be implemented relatively easily either in specialized hardware or in existing printer drivers. Other objects will, in part, be obvious and will, in part, appear hereinafter.

DESCRIPTION OF THE INVENTION

SUMMARY OF THE INVENTION

Briefly, the present invention comprises an adaptive filtering and thresholding arrangement that improves the quality of halftone images by minimizing artifacts due to error diffusion halftoning operations. In accordance with an aspect of the adaptive arrangement, a set of error filters having different sizes and proportional weighting coefficients are provided for diffusing quantization errors among neighboring pixels in predetermined tonal areas of an image. These error filter circuits are selectively applied to input image pixels in response to the grayscale color tone of the pixels and the radii of printed dots for those pixels. As for the latter consideration, predetermined mathematical models are employed to define groups of error filter circuits relating to desired output print resolutions. For example, a "small" filter may be applied to high-tonal pixels for high resolution printing so as to maintain fine details of an image area, while a "large" filter may be applied to darker, mid-tone areas to produce smooth halftones for such resolution.

Although this aspect of the inventive arrangement reduces the graininess of images over a full-tone range, visible pattern distortion may arise at certain input image pixel values and, more particularly, at the intersection of two widely disparate filtered areas. Therefore, in accordance with another aspect of the present invention, "noise" is adaptively applied to threshold values at selected pixel locations. That is, unlike the prior art processing technique where noise is constantly added to the threshold value at each pixel of an image, the present arrangement modulates the threshold value with random noise only at selected input image pixel ranges and only at the borders of dissimilarly filtered areas. Moreover, the amount of added noise varies depending upon the ranges of input pixel values and the extent of the different filters.

Advantageously, the inventive adaptive filtering and thresholding arrangement can be incorporated easily into driver software of a printing device at relatively little cost or embodied in specialized hardware in the printer port or the printer itself. When the inventive arrangement is utilized, high-quality halftone images may be produced by means of error diffusion halftoning with minimized worm-type artifacts.

BRIEF DESCRIPTION OF THE DRAWING

For a better understanding of the nature and objects of the invention, reference should be had to the following detailed description, taken in connection with the accompanying drawing, in which:

FIG. 3 illustrates a sequence for processing pixels in a conventional line processing pattern using the modified error diffusion technique of the present invention;

FIGS. 4A and 4B depict illustrative selections of "small" error filters with proportional coefficients used in the modified error diffusion technique when processing input image pixels for hard copy resolution printing in accordance with a first mathematical model;

DETAILED DESCRIPTION OF AN ILLUSTRATIVE EMBODIMENT

Figure 1:
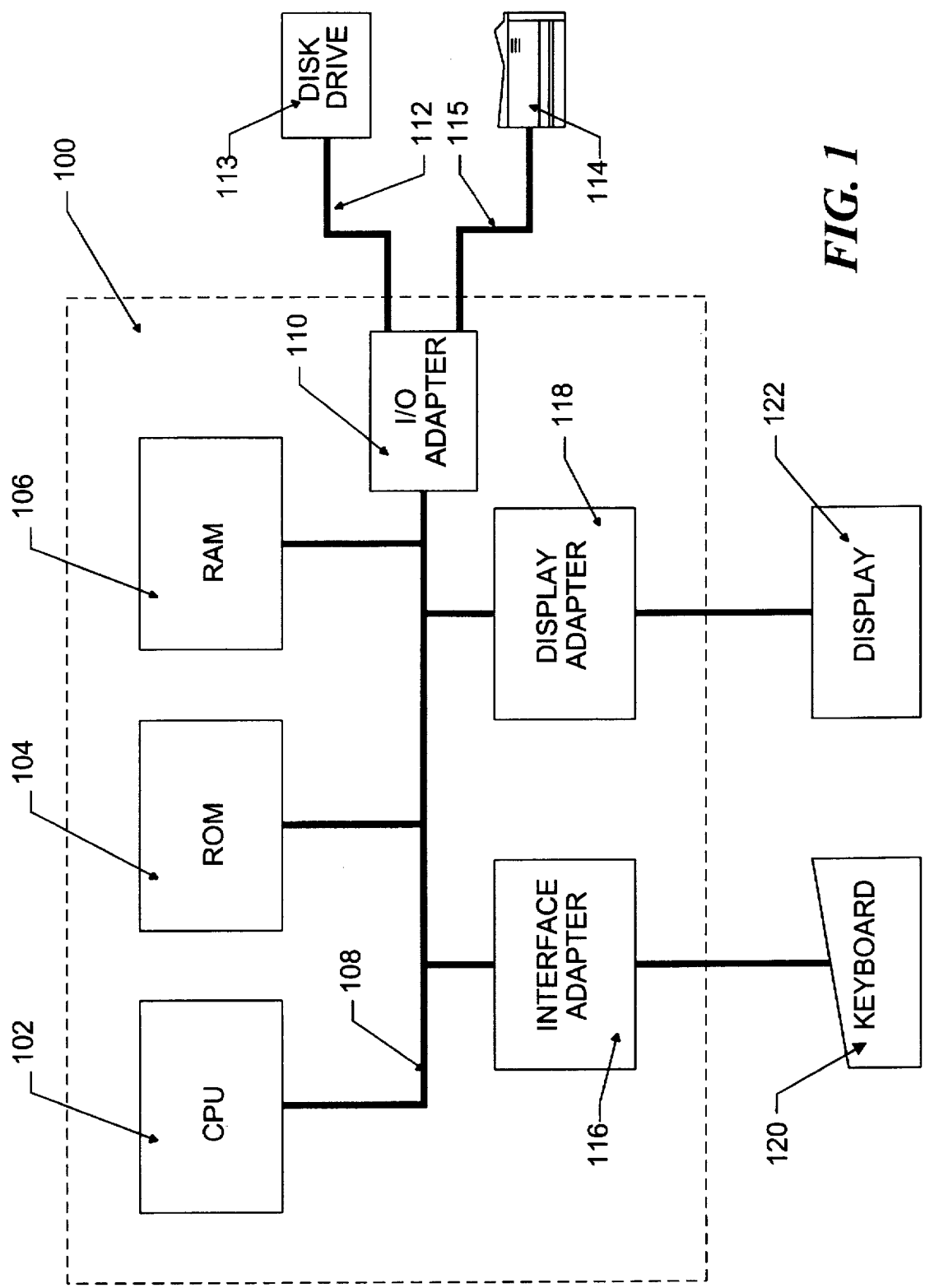
FIG. 1 is a block schematic diagram of a computer system, for example, a personal computer system on which a halftoning operation using an error diffusion technique as modified by the inventive adaptive arrangement can operate.

The invention is preferably practiced in the context of an operating system resident on a personal computer such as the IBM PS/2 or Apple Macintosh computer. A representative hardware environment is depicted in FIG. 1, which illustrates a typical hardware configuration of a computer 100 in accordance with the subject invention. The computer 100 is controlled by a central processing unit (CPU) 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 112 and 115, respectively. A user interface adapter 116 is also provided for connecting input devices, such as a keyboard 120 and other known interface devices including mice, speakers and microphones, to the bus 108. Visual output is provided by a display adapter 118 which connects the bus 108 to a display device 122 such as a video monitor. The computer 100 has resident thereon, and is controlled and coordinated by, an operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed by a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

Figure 2:
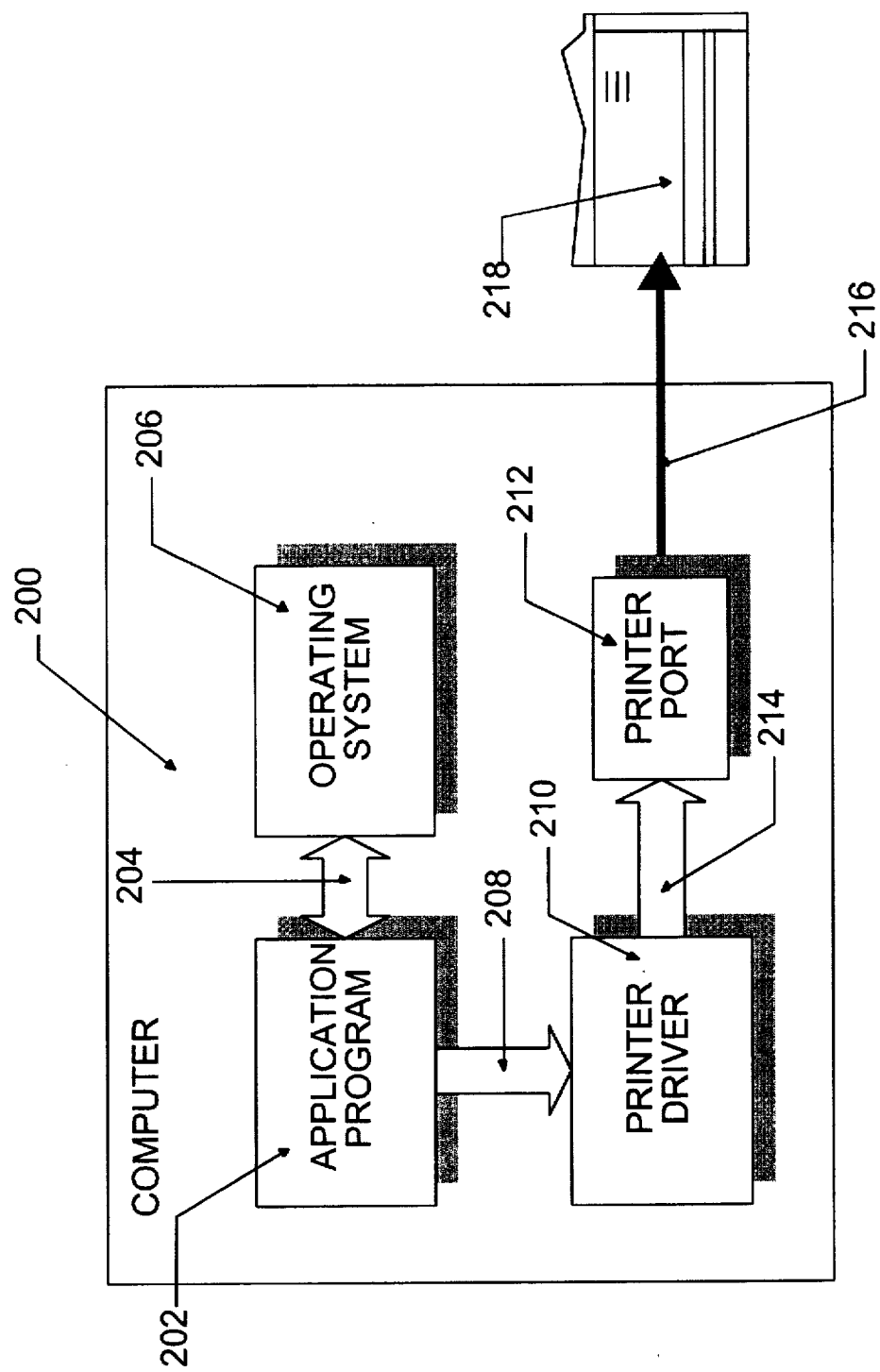
FIG. 2 is a schematic block diagram of a prior art computer system showing the relationship of an application program, an operating system and a printer driver in which the halftoning or preprocessing operation is performed.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computer systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 generally performs halftoning operations and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218. Printer 218 usually contains an "imaging engine" which is a hardware device or a ROM-programmed computer which takes the incoming information stream and converts it into the electrical signals necessary to drive the actual printing elements. The result is a "hard copy" output on the selected medium. The present invention and the apparatus which performs the error diffusion process may also be incorporated into specialized hardware located in the printer port 212 or the printer 218 itself.

The error diffusion process itself is well-known and is, for example, described in detail in "Digital Halftoning"" by Robert Ulichney, printed by the MIT Press, Cambridge, Mass. and London, England, 1990, at pps. 239–319. During the error diffusion process, the pixels which comprise the original image are processed on a line-by-line fashion wherein alternate lines of pixels are processed in opposite directions (from left-to-right and right-to-left). A common line processing pattern is shown in FIG. 3 where each of the pixel lines 300, 304 and 308 is processed from left-to-right, and each of the pixel lines 302 and 306 is processed from right-to-left, and the following alternate lines are processed in opposite directions until the entire image is processed from top to bottom.

As is known, error diffusion is performed using an error filter circuit having proportional weights, each of which adds a portion of the quantization error to the input values of the next pixel in the processing line and to neighboring pixels in the following line. The quantization error is added to the pixel values before processing so that the quantization error is spread over several pixels. Although such error diffusion produces an excellent image reproduction, it also creates well-known artifacts called "worms" which degrade image quality.

In accordance with the present invention, a set of error filters are provided for improving the quality of an image. Specifically, these error filters may have different sizes and proportional weighting coefficients for diffusing quantization errors among neighboring pixels in predetermined tonal areas of an image to achieve smooth halftone image quality. As described herein, the error filter circuits are adaptively applied to selected input image pixels in response to the grayscale color tonal values of the pixels and the radii of printed dots for those pixels.

More specifically, predetermined mathematical models are employed to define groups of error filter circuits relating to desired output print resolutions. In the illustrative embodiment, the following mathematical models are preferably used:

Model 1

$$\frac{1}{dpi} \leq \text{radius} < \frac{\sqrt{2}}{dpi}$$

Model 2

$$\frac{1}{dpi} > \text{radius} \geq \frac{\sqrt{2}}{2dpi}$$

where radius is the radius of a printed dot and dpi is the number of dots per inch. Typically, Model 1 specifies relatively large print dot size (e.g., Epson Styllus color printer at 720 dpi mode) using error filter circuits of type depicted in FIGS. 4 and 5, whereas Model 2 specifies normal print dot size (e.g., Epson Styllus color printer at 360 dpi mode) error filters of the type shown in FIG. 7.

FIGS. 4A and 4B illustrate diffusion of quantization errors generated during the processing of input image pixels to neighboring pixels in the case where "small" error filters are selected to facilitate high-resolution, hard-copy printing as specified by Model 1. These small error filters are typically employed to optimize high-tonal image pixels and to maintain fine details of that image. In the illustrative embodiment described herein, these small error filters are used for printing at a pixel density of 720 dpi, although other pixel densities conforming to Model 1 may also be utilized within the teachings of the invention.

Each input image pixel is processed by comparing its value to a predetermined threshold value where the pixel "value" is the original input grayscale value plus error adjustments resulting from the previous processing of other pixels. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

The "diffusion" process shown in FIG. 4A illustrates processing of a line of pixels in the left-to-right direction where the pixel being processed is depicted as box 400. In the illustrated arrangement, the error resulting from the processing is spread to neighboring pixels by skipping those pixels located immediately beneath and immediately to the right of the pixel 400. That is, the quantization error is diffused over an error field that includes (i) a pixel adjacent to the pixel at the immediate right of the processed pixel 400 as indicated by arrow 402, (ii) pixels on the next line of binary pattern pixels as indicated by arrows 404 and 408, and (iii) a pixel on the next subsequent line of binary pattern pixels, adjacent to the pixel immediately beneath the processed pixel 400, as indicated by arrow 406.

Before being added to the neighboring pixels, the error value is multiplied by a proportionality constant. The values of these constants, $q_1$ $q_2$ $q_3$ and $q_4$ are arranged such that $q_1+q_2+q_3+q_4=1$. Furthermore, the following weights are preferably used for the illustrative printing density of 720 dpi: $q_1=7/16$, $q_2=3/16$, $q_3=1/16$ and $q_4=5/16$. After pixel 400 has been processed, the neighboring pixel to the right of pixel 400 is processed by adding the proportionalized error value to the pixel value and processing it in the same manner as pixel 400. This method continues until each pixel in the line has been processed in this manner.

The diffusion process for processing a line of pixels in the right-to-left direction is illustrated in FIG. 4B where the pixel being processed is depicted as box 410. For this particular arrangement, the error resulting from the processing is spread to the neighboring pixels in the manner described above for the previous filter of FIG. 4A and as indicated by arrows 412, 414, 416 and 418. As with that previous filter, the error value is multiplied by a proportionality constant before being added to these neighboring pixels and the values of the constants $q_1$ $q_2$ $q_3$ and $q_4$ are arranged such that $q_1+q_2+q_3+q_4=1$. The following weights are preferably employed for the illustrative printing density of 720 dpi: $q_1=7/16$, $q_2=3/16$, $q_3=1/16$ and $q_4=5/16$. After pixel 410 has been processed, the pixel to the immediate left of pixel 410 is processed by adding the proportionalized error value to the pixel value and processing it in the same manner as pixel 410. Upon processing each pixel in the line in a similar manner, the next line in the image is processed as described in FIG. 4A.

Figure 5A:
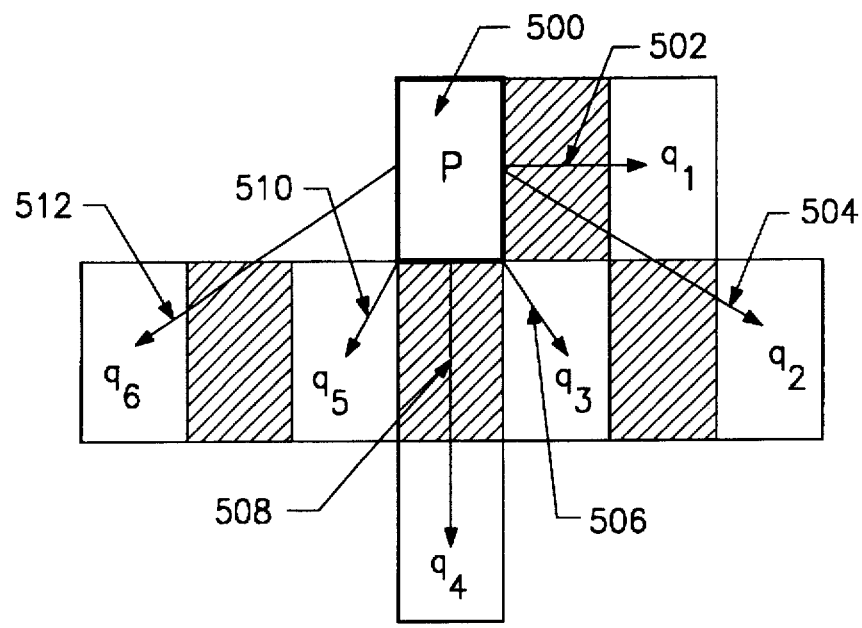
FIGS. 5A and 5B depict illustrative selections of "large" error filters having proportional coefficients used in the modified error diffusion technique when processing input image pixels for hard copy resolution printing in accordance with the first model.
Figure 5B:
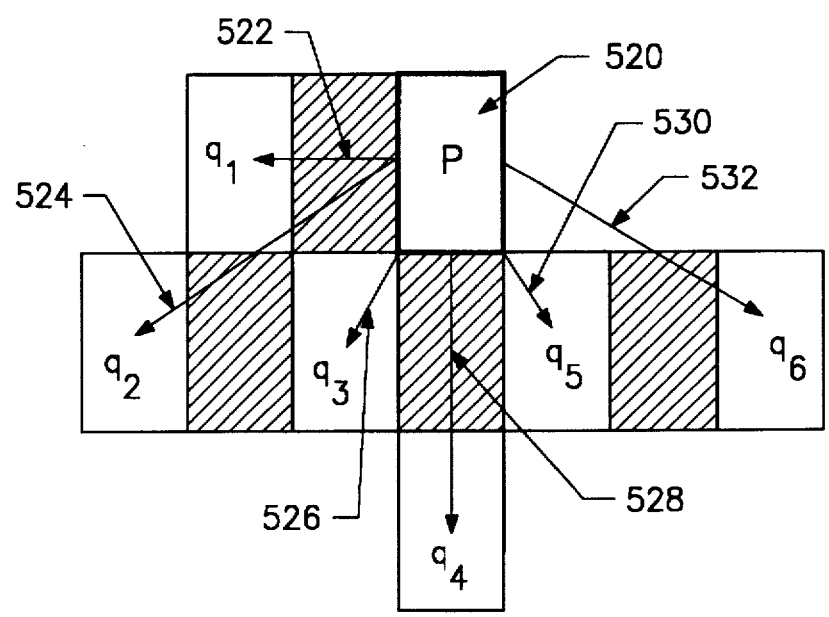

FIGS. 5A and 5B illustrate diffusion of errors generated during the processing of input image pixels to neighboring pixels of an error field in the case where "large" error filters are employed to facilitate high-resolution, hard-copy pixel printing as specified by Model 1. According to the inventive principles set forth herein, these large error filters are preferably applied to darker, mid-tone pixel areas to optimally produce smooth halftones in such shadow-tone areas.

Specifically, the diffusion process shown in FIG. 5A processes a line of pixels in the left-to-right direction where the pixel being processed is depicted as box 500. In the illustrated arrangement, the error resulting from the processing is spread to neighboring pixels by not only skipping those pixels located immediately beneath and to the right of the pixel 500 (as in the case with the small error filters of FIG. 4), but also skipping pixels adjacent to remaining pixels of the error field. That is, the quantization error is diffused among (i) a pixel adjacent to the pixel at the immediate right of the processed pixel 500 as indicated by arrow 502, (ii) four pixels, each displaced by one pixel location, on the next line of binary pattern pixels as indicated by arrows 504, 506, 510 and 512, and (iii) a pixel on the next subsequent line of binary pattern pixels, adjacent to the pixel immediately beneath the processed pixel 500, as indicated by arrow 508.

Before being added to these neighboring pixels, the error value is multiplied by a proportionality constant, the values of which, e.g., $q_1$ $q_2$ $q_3$ $q_4$ $q_5$ and $q_6$, are arranged such that $q_1+q_2+q_3+q_4+q_5+q_6=1$. Furthermore, the following weights are preferably used for the illustrative printing density of 720 dpi: $q_1=9/32$, $q_2=1/32$, $q_3=6/32$, $q_4=5/32$, $q_5=8/32$ and $q_6=3/32$. After pixel 500 has been processed, the pixel to the immediate right of pixel 500 is processed by adding the proportionalized error value to the pixel value and processing it in the same manner as pixel 500. This method continues until each pixel in the line has been processed in this manner.

The diffusion process for processing a line of pixels in the right-to-left direction is illustrated in FIG. 5B where the pixel being processed is depicted as box 520. In the illustrated arrangement, the error resulting from the processing is spread to the neighboring pixels in the manner described above for the error filter of FIG. 5A and as indicated by arrows 522, 524, 526, 528, 530 and 532. Once again, the error value is multiplied by a proportionality constant before being added to these neighboring pixels and the values of the constants $q_1$ $q_2$ $q_3$ $q_4$ $q_5$ and $q_6$ are arranged such that $q_1+q_2+q_3+q_4+q_5+q_6=1$. As with the error filter of FIG. 5A, the following weights are preferably employed for the illustrative printing density of 720 dpi: $q_1=9/32$, $q_2=1/32$, $q_3=5/32$, $q_4=5/32$, $q_5=8/32$ and $q_6=3/16$. After pixel 520 has been processed, the pixel to the immediate left of pixel 520 is processed by adding the proportionalized error value to the pixel value and processing it in the same manner as pixel 520. Upon processing each pixel in the line in this manner, the next line in the image is processed as described in FIG. 5A.

As noted, the small error filters of FIG. 4 are preferably employed to optimize high-tonal image pixels, while use of the large filters shown in FIG. 5 optimize mid-tone and shadow-tone pixel areas. Selection of an appropriate filter is preferably further determined by the following algorithm:

if, (input image pixel value≧240) or (|error value|<64)

then, use filter of FIG. 4(A or B), else, use filter of FIG. 5(A or B).

Thus, in accordance with the invention, selection of an error filter is dependent upon the comparison of an input image pixel value with a first reference or the comparison of the absolute (quantization) error value with a second reference. Of course, the choice between each of the two filters of FIG. 4 (A or B) and FIG. 5 (A or B) depends upon the particular processing direction as indicated by the pixel line processing pattern of FIG. 3.

Figure 6:
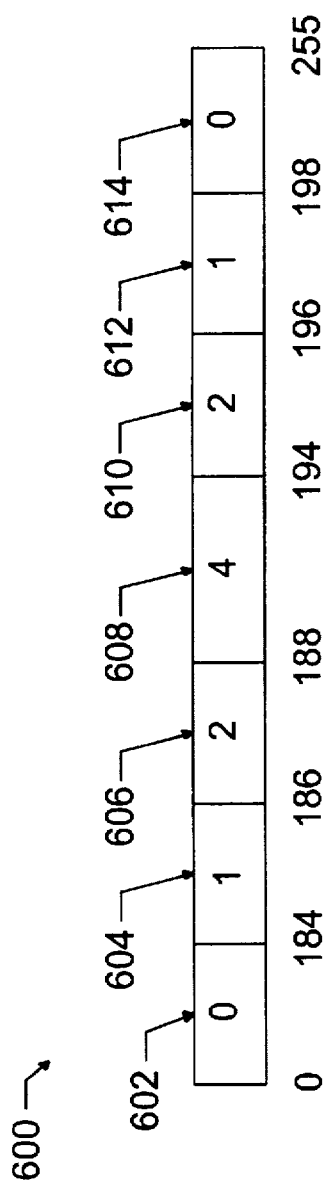
FIG. 6 depicts an illustrative selection of error quantities added to a halftoning threshold value used in the modified error diffusion technique when processing selected ranges of input image pixels for hard copy printing in accordance with the first model.

FIG. 6 illustrates a register 600 comprising a plurality of storage locations that contain various error (noise) quantities which may be added to a halftoning threshold value when processing selected ranges of input image pixels for hard copy printing as specified by Model 1. Preferably, these noise errors are used to modulate the threshold value only at selected input image pixel value ranges and at the borders of widely dissimilarly filtered pixel areas. As described below, the amount of threshold modulation varies depending upon the ranges of input pixel values and types of differing filters.

In the illustrative embodiment, 1-bit of random noise is added to the threshold value when the value of an input image pixel falls within the grayscale range of [184–186) or (196–198] as indicated by storage locations 604 and 612. (It should be noted that brackets "[,]" are used to indicate that adjacent quantities are included within the range of values, while parentheses "(,)" indicate that adjacent quantities are excluded.) Likewise, 2-bits of random noise are added to threshold value for input pixel values ranging from [186–188) or (194–196] as indicated by storage locations 606 and 610, and 4-bits of random noise are added to the threshold value for input pixel values ranging from [188–194] as indicated by storage location 608. For input pixel values ranging from [0–184) or (198–255], no noise is added to the threshold value as indicated by storage locations 602 and 614.

FIGS. 7A–7E illustrate diffusion of errors generated during the processing of input image pixels to neighboring pixels in the case where various error filters are utilized to facilitate hard-copy pixel printing as specified by Model 2. Here, these error filters are used for printing at a preferred pixel density of 360 dpi, although other pixel densities conforming to Model 2 may also be utilized within the teachings of the invention. The diffusion processes shown in FIGS. 7A–7E illustrate processing of a line of pixels in the left-to-right direction; however, mirror images of these filters may be used to process a line of pixels in the right-to-left direction.

Figure 7A:
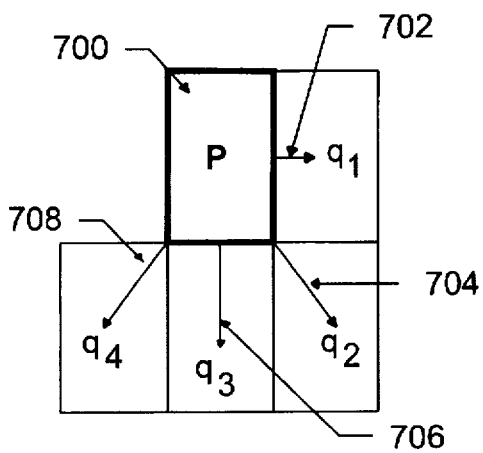
FIGS. 7A–7E depict illustrative selections of error filters with proportional coefficients used in the modified error diffusion technique when processing input image pixels for hard copy printing in accordance with a second mathematical model.

In FIG. 7A, the pixel being processed is depicted as box 700. In the illustrated arrangement, the error resulting from the processing is spread to a neighboring pixel located at the immediate right of the processed pixel 700 (as indicated by arrow 702) and to three neighboring pixels on the next line of binary pattern pixels as indicated by arrows 704, 706 and 708.

Before being added to the neighboring pixels, the error value is multiplied by a proportionality constant. The values of these constants, $q_1$ $q_2$ $q_3$ and $q_4$ are arranged such that $q_1+q_2+q_3+q_4=1$. Furthermore, the following weights are preferably used for the illustrative printing density of 360 dpi: $q_1=9/16$, $q_2=1/16$, $q_3=3/16$ and $q_4=3/16$. After pixel 700 has been processed, the neighboring pixel to the right of pixel 700 is processed by adding the proportionalized error value to the pixel value and processing it in the same manner as pixel 700. This method continues until each pixel in the line has been similarly processed.

Figure 7B:
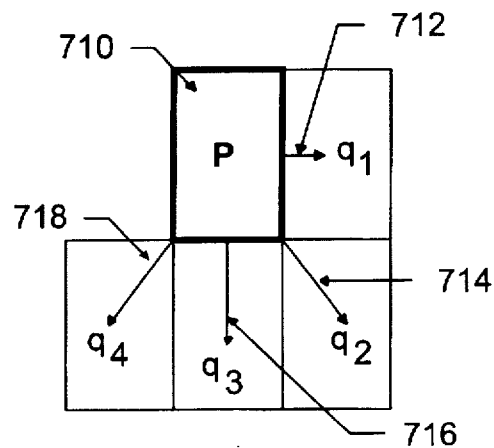
Figure 7C:
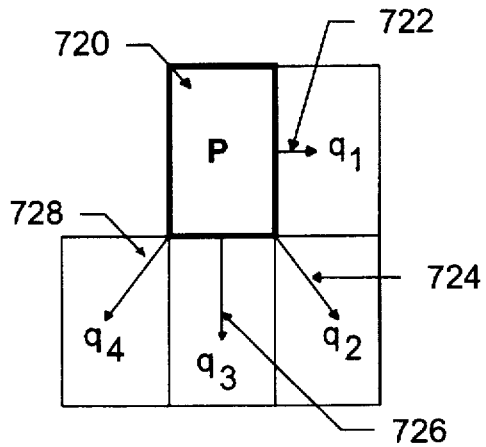
Figure 7D:
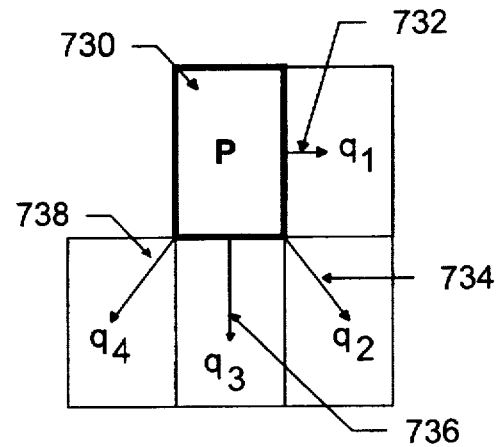
Figure 7E:
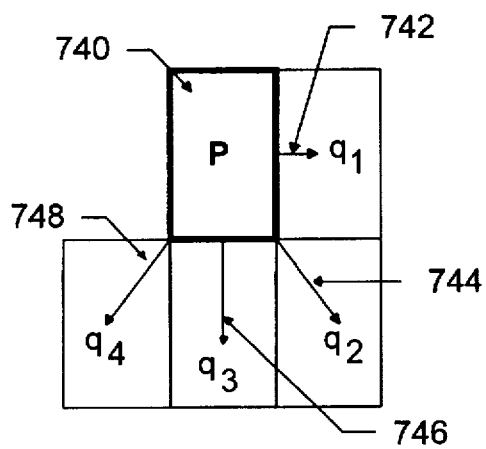

The error filters shown in FIGS. 7B–7E are configured in a manner similar to that of FIG. 7A, such that the errors resulting from the processing are spread to neighboring pixels to the immediate right of the processed pixels (710, 720, 730 and 740) and to the neighboring pixels on the next lines of binary pattern pixels. Significantly, the following weights are preferably used for the illustrative printing density of 360 dpi:

FIG. 7B: $q_1=8/16$, $q_2=1/16$, $q_3=4/16$ and $q_4=3/16$;
FIG. 7C: $q_1=7/16$, $q_2=1/16$, $q_3=5/16$ and $q_4=3/16$;
FIG. 7D: $q_1=6/16$, $q_2=1/16$, $q_3=6/16$ and $q_4=3/16$;
FIG. 7E: $q_1=7/16$, $q_2=1/16$, $q_3=5/16$ and $q_4=3/16$.

It should be noted that the difference in weighted coefficients is rather nominal among the filters of FIGS. 7A–7E. In fact, the most radical difference occurs between the filters of FIGS. 7A and 7D; therefore, in accordance with the principles of the invention, noise is added to the threshold value at the intersection of these two filters. Moreover, the filters of FIGS. 7A–7E are optimally applied to selected ranges of input image pixel values; in the illustrative embodiment disclosed herein, those selected ranges are preferably associated with the following pixel values:

Filter of FIG. 7A: image pixel value range [255–234];
Filter of FIG. 7B: image pixel value range (234–221];
Filter of FIG. 7C: image pixel value range (221–213];
Filter of FIG. 7D: image pixel value range (213–189];
Filter of FIG. 7E: image pixel value range (189–0].

Figure 8:
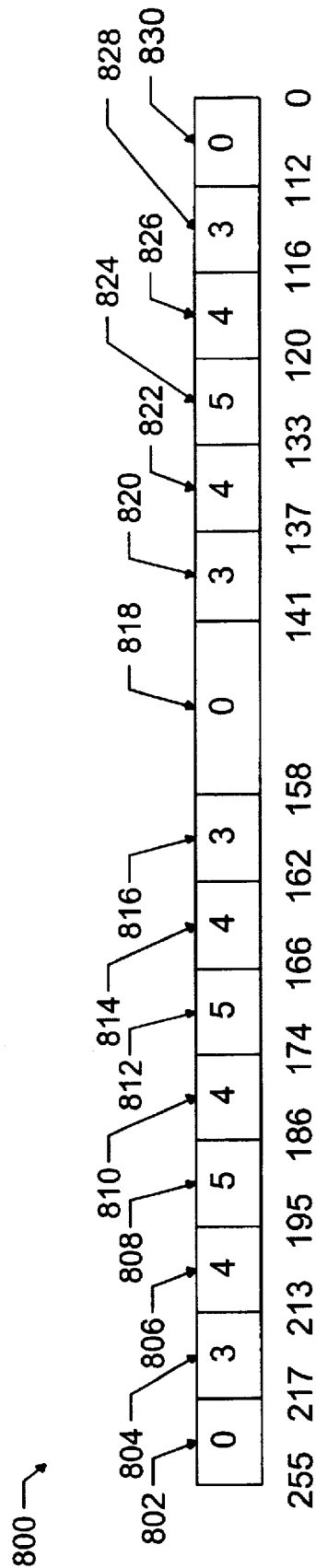
FIG. 8 depicts an illustrative selection of error quantities added to a halftoning threshold value used in the modified error diffusion technique when processing selected ranges of input image pixels for hard copy printing in accordance with the second model.

FIG. 8 illustrates a register 800 containing various noise (error) quantities added to a halftoning threshold value when processing selected ranges of input image pixels for hard copy printing as specified by Model 2. In accordance with the present invention, these noise errors are added to the threshold value only at selected input image pixel ranges and at the borders of widely disparate filtered pixel areas. As noted, the amount of added noise varies depending upon the ranges of input pixel values and types of differing filters.

In the illustrative embodiment, 3-bits of random noise are added to the threshold value when the value of an input image pixel falls within the grayscale range of [217–213), [162–158), [141–137) or [116–112) as indicated by storage locations 804, 816, 820 and 828, respectively; 4-bits of random noise are added to threshold value for input pixel values ranging from [213–195), [186–174), [166–162),

[137–133) or [120–116) as indicated by storage locations 806, 810, 814, 822 and 826, respectively; and 5-bits of random noise are added to the threshold value for input pixel values ranging from [195–186), [174–166) or [133–120) as indicated by storage locations 808, 812 and 824, respectively. For input pixel values ranging from [255–217), [158–141) or [112–0], no noise is added to the threshold value as indicated by storage locations 802, 818 and 830.

Figure 9:
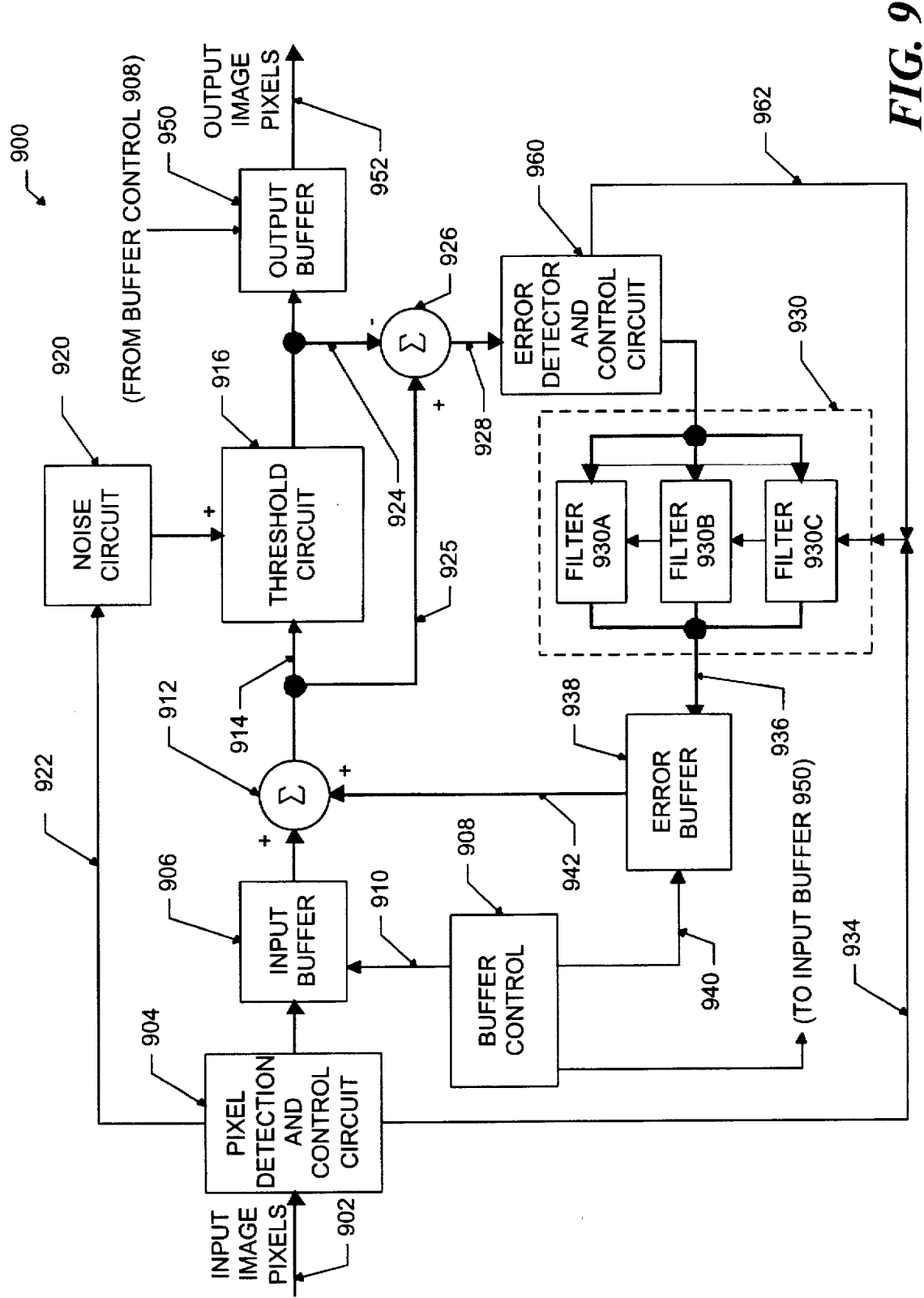
FIG. 9 is a block schematic diagram of an error diffusion halftoning apparatus used for selecting error filters in response to varying input image pixel areas and for adding noise to threshold values at selected of those areas.

FIG. 9 is an illustrative schematic block diagram depicting an error diffusion circuit 900 modified in accordance with the principles of the invention. The error diffusion circuit receives a stream 902 of input grayscale image pixels represented by digital words from an imaging device (not shown) in a conventional manner. The stream of image pixels is received by a pixel detection and control circuit 904 that is configured to control various other elements of the error diffusion circuit 900. Specifically, as described further below, the pixel detection and control circuit 904 determines the values of the input image pixels according to the algorithm described above and, in response to this determination, generates control signals for activating appropriate error filters; the circuit 904 is further configured to selectively modulate the threshold value in response to the determination of pixel values.

The input image pixels pass serially through the detection and control circuit 904 and into a conventional input buffer 906. Buffer 906 is, in general, of sufficient size to store incoming image pixel words for an entire line of pixels although other buffer sizes are contemplated within the teachings of the invention. Buffer 906 is, in turn, controlled by buffer control circuit 908 (as indicated schematically by arrow 910) to output the stored values, in line order, to a summing circuit 912 that is configured to sum "error" values produced by the processing of previous pixels as described further below. In particular, under control of the buffer control circuit 908, buffer 906 can serially output the stored pixel data either in a "left-to-right" order (last-in, first-out) or can output the stored pixel data in a "right-to-left" order (first-in, first-out).

The stored input data produced at the output of input buffer 906 is applied to a threshold circuit 916 by way of summing circuit 912 and line 914. The output of threshold circuit 916 is a quantized binary image (comprised of "0's" and "1's") which is produced by comparing the pixel values (each pixel "value" comprises the original input image value and "error" adjustments introduced by summing circuit 912) with a predetermined, fixed threshold value and outputting a "1" if the pixel value is greater than the threshold and outputting a "0" if the pixel value is less than or equal to the threshold value. Illustratively, the threshold circuit 916 may use a fixed threshold value such as 0.5 (for a grayscale value range between 0 and 1) or 128 (for a grayscale value range between 0 and 255).

In accordance with the invention, this fixed threshold value may be modulated by random "noise" errors generated by a noise circuit 920 when processing selected ranges of input image pixels. Noise circuit 920 preferably includes registers 600 and 800 (FIGS. 6 and 8) which contain quantities of random noise errors for processing selected ranges of input image pixels in anticipation of hard copy printing at, e.g., densities of 720 and 360 dpi, respectively. Specifically, a selected storage location within these registers is enabled to output its contents in response to a control signal generated by the detection and control circuit 904 over line 922. The contents of this selected storage location generally comprises a predetermined quantity, e.g. 0–5 bits, of random noise error which is added to the fixed threshold value during the quantization process.

The quantized binary signal generated by the threshold circuit 916 is applied, via output line 924, to a second summing circuit 926 which subtracts this quantized binary signal from the unquantized input signal on line 925 to generate a quantization error value on line 928. The quantization error value is fed to an error detection and control circuit 960 configured to determine the absolute value of the quantization error according to the algorithm described above. In response to this determination, the error detection and control circuit 960 may generate a control signal over line 962 for activating an appropriate error filter of a multiplexed filter circuit 930. The quantization error value is thereafter applied to the multiplexed filter circuit 930 which, in the illustrative embodiment, comprises a set of error filters 930a–n. The error filters 930a–n are described above in connection with FIGS. 4, 5 and 7.

Additionally, an appropriate error filter may be selected and activated to process the error value in response to a control signal generated by the pixel detection and control circuit 904 (after executing the algorithm described above) over line 934. Once activated, the selected filter circuit 930 multiplies the error value by proportionality coefficients to generate diffused error values on line 936 for storage in error buffer 938. These diffused error values are subsequently added to predetermined neighboring pixels by summing circuit 912 during processing of the current, next and next subsequent lines of pixels.

Error buffer 938 is also controlled by buffer control circuit 908 (as indicated schematically by arrow 940) to output selected stored values to summing circuit 912 via output line 942. Under control of the buffer control circuit 908, error buffer 938 can serially output the stored pixel data either in a "left-to-right" order (last-in, first-out) or can output the stored pixel data in a "right-to-left" order (first-in, first-out) so as to match the error data with the input data being shifted out of input buffer 906.

During processing of a line of pixels, buffer control circuit 908 controls both input buffer 906 and error buffer 938 to sequentially provide an input pixel value from buffer 906 to summing circuit 912 and a diffused error value from error buffer 938 to summing circuit 912. This summing circuit then provides sequentially error-diffused values to threshold circuit 916 which generates the quantized output. The output of the threshold circuit 916 is also provided to an output buffer 950 which is also controlled by buffer control circuit 908. Output buffer 950 can output a serial stream of binary pixels for provision to the printing device on line 952.

Operationally, the pixel detection and control circuit 904 monitors the incoming stream of input image pixels on line 902 to determine the grayscale values of those pixels. Thereafter, the detection and control circuit generates a control signal over line 922 for selectively modulating the threshold value (via noise circuit 920) produced by threshold circuit 916 in response to the determination of each pixel's value when processing that pixel during halftoning operations. When two widely disparate filters are sequentially employed during the modified error diffusion process, the pixel detection and control circuit 904 further generates an appropriate control signal to modulate the threshold value at the pixels bordering these differing filtered areas.

Additionally, the pixel detection and control circuit 904 and the error detection and control circuit 960 may generate control signals over line 934 and 962, respectively, to activate a selected error filter within the multiplexer filter circuit 930 in response to that pixel's input value or the absolute value of its associated quantization error.

It will be understood to those skilled in the art that the detection and control circuits 904 and 960 contain appropriate logic circuitry needed to generate the signals that control the circuits 920 and 930. The circuits 904 and 960 also contain circuitry required to synchronize modulation of the threshold value and activation of the error filters with the appropriate pixel values output from the input buffer 906. Furthermore, the buffer control circuit 908 contains the circuitry needed to alternate the serial output direction of each line of pixel and error values stored in buffers 906 and 938. The exact arithmetic, logical and synchronizing operations performed by circuits 904, 906 and 960, and the pixel positions selected from buffers 906 and 938, can be varied without departing from the spirit and scope of the invention.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method for improving the quality of a halftone image generated from an input stream of continuous-tone image pixels, the method comprising the steps of:

determining a grayscale value for a selected one of the pixels of the input stream;

adaptively quantizing said gray scale value of the selected pixel to generate a quantization error;

providing:
   a first error filter corresponding to a first range of quantized grayscale values and having a first size and a first weighting coefficient, and
   a second error filter corresponding to a second range of quantized grayscale values and having a second size and a second weighting coefficient; and selecting one of:
   the first error filter when the quantized grayscale value of the selected pixel is within the first range, and
   the second error filter when the quantized grayscale value of the selected pixel is within the second range, wherein said selected error filter is configured to diffuse said quantization error among neighboring pixels of said input stream in a manner that improves the quality of said halftone image.

2. The method of claim 1 wherein said selecting step comprises the step of activating an error filter configured to diffuse said quantization error among a relatively small number of neighboring pixels when one of said grayscale value is greater than or equal to a predefined grayscale value and the absolute value of said quantization error is less than a predefined error value.

3. The method of claim 1 wherein said selecting step comprises the step of activating an error filter configured to diffuse said quantization error among a relatively small number of neighboring pixels when said grayscale value indicates high-tone image pixels.

4. The method of claim 1 wherein said selecting step comprises the step of activating an error filter configured to diffuse said quantization error among a relatively large number of neighboring pixels when one of said grayscale value is less than a predefined grayscale value and the absolute value of said quantization error is greater than or equal to a predefined error value.

5. The method of claim 1 wherein said selecting step comprises the step of activating an error filter configured to diffuse said quantization error among a relatively large number of neighboring pixels when said grayscale value indicates mid-tone and shadow-tone image pixels.

6. The method of claim 1 wherein said adaptively quantizing step comprises the steps of:

selectively modulating a threshold value in response to said determined grayscale value;

comparing said grayscale value with said selectively modulated threshold value to produce a binary value; and substracting said binary value from said grayscale value to generate said quantization error.

7. The method of claim 6 wherein said step of adaptively modulating comprises the step of adding a predetermined quantity of noise errors to said threshold value.

8. The method of claim 7 wherein said adding step comprises the step of varying said predetermined quantity of noise errors in response to said determined grayscale value.

9. The method of claim 7 wherein said adding step comprises the step of varying said predetermined quantity of noise errors between 0–5 bits depending upon said determined grayscale value.

10. The method of claim 7 wherein said selecting step comprises the step of activating an error filter configured to diffuse said quantization error among a relatively small number of neighboring pixels when one of said grayscale value is greater than or equal to a predefined grayscale value and the absolute value of said quantization error is less than a predefined error value.

11. The method of claim 7 wherein said selecting step comprises the step of activating an error filter configured to diffuse said quantization error among a relatively large number of neighboring pixels when one of said grayscale value is less than a predefined grayscale value and the absolute value of said quantization error is greater than or equal to a predefined error value.

12. A method for improving the quality of a printed halftone image having a desired resolution, the method comprising the steps of:

storing an array of electronically encoded pixels representative of tonal values associated with a source image;

adaptively filtering a selected one of said encoded pixels in accordance with a multiplexed filter circuit that is enabled, in response to said representative tonal values and said desired resolution, for activation by one of:
   a first error filter corresponding to a first range of quantized grayscale value and having a first size and a first weighting coefficient and
   a second error filter corresponding to a second range of quantized grayscale values and having a second size and a second weighting coefficient,
   wherein the first error filter is selected when the quantized grayscale value of the selected pixel is within the first range and the second error filter is selected when the quantized grayscale value of the selected pixel is within the second range;

processing the selected one of said encoded pixels into a halftone pattern which, when printed, emphasizes fine details of the source image at highlight and upper midtone regions, and refines halftones at darker and lower midtone regions; and printing said halftone pattern onto a recording medium with said desired resolution.

13. The method of claim 12 wherein said processing step comprises the step of quantizing a first encoded pixel to generate a quantization error.

14. The method of claim 13 wherein said adaptively filtering step comprises the step of spreading said quantization error proportionally among substantially adjacent neighboring encoded pixels of the array.

15. The method of claim 14 wherein said substantially adjacent neighboring pixels excludes those encoded pixels of the array positioned immediately to the right and immediately beneath said first encoded pixel.

16. The method of claim 14 wherein said substantially adjacent neighboring pixels includes those encoded pixels of the array positioned immediately to the right and immediately beneath said first encoded pixel.

17. Apparatus for improving the quality of a halftone image generated from an input stream of continuous-tone image pixels, the apparatus comprising:

means for determining grayscale values for a selected one of the pixels of the input stream;

means for adaptively quantizing said grayscale value of the selected pixel to generate quantization errors;

a first error filter corresponding to a first range of quantized grayscale values and having a first size and a first weighting coefficient;

a second error filter corresponding to a second range of quantized grayscale values and having a second size and a second weighting coefficient; and means for selecting one of:

said first error filter when said quantized grayscale value of the selected pixel is within the first range, and said second error filter when the quantized grayscale value of the selected pixel is within the second range, wherein said selected error filter is configured to diffuse said quantization errors among neighboring pixels of said input stream in a manner that improves the quality of said halftone image.

18. The apparatus of claim 17 wherein said selecting means comprises means for activating error filters configured to diffuse said quantization errors among one of:

a relatively small number of neighboring pixels when one of said grayscale values are greater than or equal to a predefined grayscale value and the absolute values of said quantization errors are less than a predefined error value; and a relatively large number of neighboring pixels when one of said grayscale values are less than a predefined grayscale value and the absolute values of said quantization errors are greater than or equal to a predefined error value.

19. The apparatus of claim 18 wherein said activating means comprises one of a pixel detection and control circuit and an error detection and control circuit.

20. The apparatus of claim 19 wherein said adaptively quantizing means comprises means for selectively modulating a threshold value in response to said determined grayscale values.

21. The apparatus of claim 20 wherein said selectively modulating means comprises:

a threshold circuit for iteratively comparing said grayscale values with a threshold value and generating, from the comparison, binary raster values; and a summing circuit for substracting said binary raster values from said grayscale values to generate said quantization errors.

22. The apparatus of claim 21 wherein the threshold circuit is coupled to a noise circuit adapted to randomly modify said threshold value in response to a control signal generated by said pixel detection and control circuit.

23. The apparatus of claim 22 further comprising an image line buffer for storing the grayscale values of an immediately previous series of pixels of the input stream, and wherein the previously processed pixels are selected from the buffer.

24. The system of claim 23 further comprising:

an output buffer for storing the binary raster values; and an error buffer for storing said quantization errors of the immediately previous series of pixels, and wherein values of said quantization errors are selected from the error buffer.

25. A computer system comprising:

a memory for storing data and programs;

a central processing unit responsive to programs stored in the memory for controlling and coordinating the operation of the computer system;

digitizing means responsive to a continuous-tone image for generating a stream of electronically encoded pixel values, each representing a grayscale value of a portion of the continuous-tone image;

means responsive to the stream of electronically encoded pixel values for storing the electronically encoded pixel values in a plurality of linear segments, each linear segment comprising pixel values that represent contiguous portions of the continuous-tone image;

a pixel detection and control circuit for determining the grayscale value of a selected one of the electronically encoded pixels;

means for adaptively quantizing the grayscale value of the selected pixel to process the encoded pixels into a halftone pattern and to generate quantization errors;

a filter circuit including a first error filter corresponding to a first range of quantized grayscale values and having a first size and a first weighting coefficient, and a second error filter corresponding to a second range of quantized grayscale values and having second size and a second weighting coefficient, wherein the first error filter is selected when the quantized grayscale value of the selected pixel is within the first range and the second error filter is selected when the quantized grayscale value of the selected pixel is within the second range; and a printer responsive to the adaptively quantizing means and the filter circuit for printing the halftone pattern of monochrome dots on a print medium to generate a halftone image.

* * * * *

UNITED STATES PATENT AND TRADEMARK OFFICE
CERTIFICATE OF CORRECTION

PATENT NO. : 5,757,976
DATED : May 26, 1998
INVENTOR(S) : Joseph Shu

It is certified that errors appear in the above identified patent and that said Letters Patent is hereby corrected as shown below:

Title page, item 56, References Cited, U.S. Patent Documents, insert --4,876,610 10/1989 Ohsawa, et al.--.

Title page, item 56, References Cited, Foreign Patent Documents, insert --88 07306 9/1988 WO-- and --0476 220 3/1992 EPO--.

Title page, item 56, References Cited, Other Publications, change "vol. VVX" to --vol. XXV--.

Title page, item 56, References Cited, Other Publications, insert --Journal of Electronic Imaging, vol. 3, no. 2, April 1994, Bellingham, WA (US), pages 198-202, XP 000452075, R. Eschbach: "Pixel-based error-diffusion algorithm for producing clustered halftone dots".

Column 14, line 50, change "value" to --values--.

Column 16, line 4, change "substracting" to --subtracting--.

Signed and Sealed this

Thirteenth Day of October 1998

*Attest:*

BRUCE LEHMAN

*Attesting Officer*  *Commissioner of Patents and Trademarks*